(12) United States Patent
Hirata et al.

(10) Patent No.: US 7,419,315 B2
(45) Date of Patent: Sep. 2, 2008

(54) LENS DEVICE

(75) Inventors: Hiroyuki Hirata, Ibaraki (JP); Masatoshi Hashimoto, Ibaraki (JP)

(73) Assignee: Hitachi Maxell, Ltd, Ibaraki-shi (JP)

( * ) Notice: Subject to any disclaimer, the term of this patent is extended or adjusted under 35 U.S.C. 154(b) by 416 days.

(21) Appl. No.: 11/332,261

(22) Filed: Jan. 17, 2006

(65) Prior Publication Data

US 2006/0158748 A1 Jul. 20, 2006

(30) Foreign Application Priority Data

Jan. 19, 2005 (JP) ............................ 2005-011784

(51) Int. Cl.
*G03B 17/00* (2006.01)
*G02B 7/02* (2006.01)

(52) U.S. Cl. ...................... 396/529; 359/819

(58) Field of Classification Search ........................ None
See application file for complete search history.

(56) References Cited

U.S. PATENT DOCUMENTS 6,501,605 B2 * 12/2002 Moriya ........................ 359/819

7,362,519 B2 * 4/2008 Sakaki ........................ 359/811
2001/0007513 A1 * 7/2001 Koshimizu et al. .......... 359/811

FOREIGN PATENT DOCUMENTS

JP A 04-204408 7/1992

* cited by examiner

*Primary Examiner*—Patrick Assouad
*Assistant Examiner*—Autumn Parker
(74) *Attorney, Agent, or Firm*—Oliff & Berridge, PLC

(57) ABSTRACT

In a lens device, plastic lenses having circular outer periphery are placed in a plastic lens-barrel having an octagonal or more complex polygonal inner surface in such a way that the outer peripheral surfaces of the lenses are press contacted to the inner surface of the polygonal shape. This lens device has press contact portions that are pressed by the lens outer peripheral surface and the lens-barrel inner surface in the vicinity and in both sides of gate traces where optical axis displacement is large so as to suppress the displacement of the gate trace by the press contact portions.

17 Claims, 9 Drawing Sheets

LENS DEVICE

BACKGROUND OF THE INVENTION

1. Field of the Invention

The present invention relates to a lens device where a lens used for a camera or the like is inserted and fixed in a lens-barrel.

2. Description of Related Art

A digital camera, a mobile phone camera and so on use a lens device in which one or a plurality of lenses are inserted and fixed in a lens-barrel. Such a lens device is manufactured by performing core alignment so as to align the optical axes of a lens and a lens-barrel and the optical axes of a plurality of lenses and then inserting and fixing the lenses into the lens-barrel.

In such a lens device, a plastic lens, a plastic lens-barrel and so on are used because they are low cost and easy to form a desired shape.

The plastic lens and lens-barrel, however, are subject to expansion and shrinkage due to temperature or humidity change. Thus, even if core alignment is performed when inserting and fixing the lens into the lens-barrel to assemble them, the misalignment of the optical axes between a lens and a lens-barrel or between lenses can occur upon temperature or humidity change, which results in deterioration in optical properties.

In order to solve the above problem, Japanese Unexamined Patent Application Publication No. 04-204408 proposes a lens device with a plastic lens and a lens-barrel for holding the lens. The lens device has at least three protrusions that are formed on the inner surface of the lens-barrel to project toward the center axis (optical axis) of the lens-barrel so as to hold the lens with their ends in contact with the periphery of the lens. The diameter of the circle which the protrusion ends inscribe is smaller than the outer diameter of the lens that is supported by the protrusions. Further, the rigidity of the lens-barrel is smaller than the rigidity of the plastic lens. The lens device thereby prevents the decentering or distortion of the lens under change in dimension due to environments such as temperature and humidity.

According to this proposed technique, the center of the lens always receives the force that corresponds to the center of the lens-barrel, thereby preventing the decentering and holding the lens at a given position in the lens-barrel. It is, however, still unable to suppress the misalignment between the lens and the lens-barrel and between the lenses sufficiently.

SUMMARY OF THE INVENTION

It is an object of the present invention to solve the above problems and provide a lens device capable of sufficiently suppressing the misalignment of optical axes between a lens and a lens-barrel or between lenses in spite of temperature or humidity change.

According to a first aspect of the present invention, there is provided a lens device in which a plastic lens having a circular outer peripheral surface is held by a plastic lens-barrel having an octagonal or more complex polygonal inner surface in such a way that the outer peripheral surface of the lens is press-contacted to the inner surface of the polygonal shape. The lens device has press contact portions in the positions within ±45 degrees from a reference line connecting the center of a gate trace that is created in the outer periphery of the lens by the injection molding of the lens and the optical axis of the lens. It is thereby possible to reduce the misalignment of optical axes between the lens and the lens-barrel in spite of temperature or humidity change.

According to a second aspect of the present invention, the lens device of the first aspect has a plurality of press contact portions in the positions within a half circle in the gate trace side with respect to the lens optical axis. It is thereby possible to reduce the misalignment of optical axes between the lens and the lens-barrel more reliably.

According to a third aspect of the present invention, the lens device of the first aspect has a plurality of press contact portions in both sides of the gate trace symmetrically with respect to the line connecting the center of the gate trace and the optical axis of the lens. It is thereby possible to manufacture the lens device in which the misalignment of optical axes between the lens and the lens-barrel is reduced more reliably.

According to a fourth aspect of the present invention, in the lens device of the first aspect, the inner surface of the lens-barrel is polygon of octagon to hexadecagon. It is thereby possible to reduce the misalignment of optical axes between the lens and the lens-barrel more reliably.

According to a fifth aspect of the present invention, in the lens device of the fourth aspect, the inner surface of the lens-barrel is a regular polygon. It is thereby possible to easily and reliably manufacture the lens device in which the misalignment of optical axes between the lens and the lens-barrel is reduced suitably in spite of temperature or humidity change.

According to a sixth aspect of the present invention, in the lens device of the first aspect, the polygonal inner surface of the lens-barrel is formed of flat surfaces constituting the side surfaces and arc-shaped connections in between the flat surfaces. It is thereby possible to easily and reliably manufacture the lens device in which the misalignment of optical axes between the lens and the lens-barrel is reduced suitably in spite of temperature or humidity change.

According to a seventh aspect of the present invention, in the lens device of the first aspect, a plurality of lenses are arranged coaxially in the lens-barrel. It is thereby possible to easily and reliably manufacture the lens device in which the misalignment of optical axes between the lens and the lens-barrel and between the plurality of lenses is reduced suitably in spite of temperature or humidity change.

According to an eighth aspect of the present invention, in the lens device of the seventh aspect, the plurality of lenses are inserted and fixed in the lens-barrel so that their gate traces are in the same direction. It is thereby possible to easily and reliably manufacture the lens device in which the misalignment of optical axes between the lens and the lens-barrel and between the plurality of lenses is reduced suitably in spite of temperature or humidity change.

According to a ninth aspect of the present invention, in the lens device of the seventh aspect, the plurality of lenses are inserted and fixed in the lens-barrel so that the gate traces of at least a lens with a largest absolute value of refractive power and a lens with a next-largest absolute value of refractive power are in the same direction. It is thereby possible to easily and reliably manufacture the lens device in which the misalignment of optical axes between the lens and the lens-barrel and between the plurality of lenses is reduced suitably in spite of temperature or humidity change.

The inventors of the present invention have studied intently on the optical axis misalignment between a lens and a lens-barrel and between lenses that occurs upon temperature and humidity changes. As a result, they have found that, in the injection molding of a plastic lens and lens-barrel, the resin flow orientation differs in the gate direction and the direction orthogonal to the gate direction to cause deviation from a circular form into an oval form, for example, thus making it difficult to keep the circularity.

If the lens and lens-barrel repeatedly expand and shrink due to temperature or humidity change in this condition, the circularity decreases easily. When the decrease in the circularity occurs both in the lens and the lens-barrel, a coaxial degree, which is referred to herein as the coaxiality, decreases accordingly to cause the misalignment of the optical axes between the lens and the lens-barrel or between the lenses.

A lens itself is not subject to the change in circularity under normal circumstances. However, a plastic lens that is manufactured by injection molding has a gate for filling resin into a mold and this portion is shaped like a flat plane where a circular outer periphery is partly cut so as to have a so-called D-shaped lens form in order to place the lens in a lens-barrel efficiently, thus causing lower circularity.

If both of the lens and the lens-barrel or either one of them are perfectly circular, the effect of distortion or circularity change due to temperature or humidity change on the coaxiality is supposed to be small. However, if both of the lens and the lens-barrel are manufactured by the injection molding and thus have low circularity, the distortion or circularity change upon temperature or humidity change causes a decrease in coaxiality. Further, in the gate trace of the lens, a relatively large gap is made when placing the lens in the lens-barrel compared with the peripheral part of the other lens. Thus, the deviation of optical axes is large due to the trace of the gate upon temperature or humidity change.

As a result of further study based on the above investigation, there is provided a lens device in which a plastic lens with a circular outer periphery is placed in a plastic lens-barrel with a polygonal inner surfaces of octagonal or more complex shape in such a way that the outer surface of the lens is press-contacted to the inner surface of the polygonal shape. The lens device holds the lens by pressing the outer peripheral surface of the lens against the inner surface of the polygonal shape. The lens device has press contact portions at the left and right sides of the trace of the gate in the vicinity of the trace of the gate. The press contact portions are pressed by the outer peripheral surface of the lens and the inner surface of the lens-barrel and serve to suppress the deviation of the optical axis due to the trace of the gate.

The gate trace in this description refers not only to the case where a part of the trace of the gate for introducing molten plastic material into a mold in the injection molding of a lens remains in a molded lens product but also the case where the trace of the gate of the lens has been entirely cut and removed so as not to remain therein.

The press contact portions can suppress the deviation of the optical axis due to the trace of the gate if they are placed in the closest proximity to the gate trace and formed both in the left and right sides. A larger number of press contact portions allows more effective suppression of the deviation of the optical axis due to the gate trace. Preferably, at least a plurality of press contact portions are placed in one side of the lower part of the arc that is adjacent to the gate trace, more preferably in both sides of the lower part of the arc. Particularly preferably, a plurality of press contact portions are placed symmetrically with respect to the line connecting the center of the gate trace and the optical axis of the lens.

If the shape of the inner peripheral surface of the lens-barrel is not octagon or more complex polygon, it is unable to suppress the misalignment of optical axes between the lens-barrel and the lens sufficiently. A large number of corners of the polygonal shape cause an increase in press resistance of the lens, which requires to set a smaller pressing margin, demanding a higher dimensional accuracy. Further, the molding processing also requires adjustment processing for the number of corners, thus increasing processing work. Therefore, a polygonal shape with 8 to 16 corners is preferred.

Though the shape and the length of each side of the inner peripheral surface of the polygon of the lens-barrel may be non-equiangular or non-equilateral, an equiangular regular polygonal shape is preferred for its easiness in mold design.

Further, as described later, a processing process for a movable core pin having a columnar protrusion as a mold to form the inner surface of a lens-barrel when producing a lens-barrel having a regular polygonal inner surface is as follows. The process first performs multi-step coaxial processing by using NC lathe so that the columnar material has a desired outer diameter. Then, it rotates the multi-step pin around the center of the multi-step pin by a desired angle according to the number of corners of the polygonal shape by using machining center and further linearly processes a part of an arc surface by end mill. At this time, the cut processing is performed by leaving a processing margin for finish. This process is repeated for the number of corners.

The obtained movable core pin is assembled into the mold and then injection molding is performed with desired resin and molding conditions, thereby producing a molded article. The circularity and coaxiality of the molded article is measured and a correction amount is added so that the circularity and coaxiality become 0. After that, the cutting amount of the end mill is adjusted appropriately by using the machining center again, thus obtaining the movable core pin in the final form. It is preferred in this time to leave an arc portion between the side surfaces according to the settings of the side length, which allows smooth release of the molded article (lens-barrel).

When placing a plurality of lenses in the lens-barrel, the plurality of lenses are arranged coaxially. If the lenses are placed and fixed in the lens-barrel so that the gate traces of at least the lens with the largest absolute value of refractive power and the lens with the next-largest absolute value of refractive power are in the same direction, the suppression effect of the deviation of the optical axes due to the gate trace caused by temperature or humidity change by the press contact portions functions substantially equally. Thus, even if it is deviated toward the gate trace side, the displacement of the optical axis in each lens becomes substantially equal, thus allowing the displacement between lenses to hardly occur, which is preferable.

The reason for forming the inner surface of the lens-barrel in a polygonal shape in this invention is because the coaxiality is not affected largely even if the lens-barrel is deformed due to processing error or temperature or humidity change. For example, if the inner surface of the lens-barrel is triangular or pentangular, the deviance in coaxiality is large even with slight deformation.

Further, a larger number of corners cause a higher press resistance of the lens, which requires to set a smaller pressing margin, demanding a higher dimensional accuracy. Thus, an arc-shaped portion is necessary. It is preferred in the arc portion that the area ratio of the arc-shaped connection between flat portions with respect to the flat portion is 1 or less. Further, the arc portion is important for verifying the accuracy of the movable core pin and the molded lens-barrel.

Furthermore, placing the relief of the gate trace of the lens within the outer diameter of the lens allows easy core adjustment by simply assembling the lens into the lens-barrel without performing any special gate processing, thereby enabling passive assembly. This eliminates a need for an expensive core adjustment device, thus allowing mass production. Further, core displacement between lenses is small to allow producing a shooting lens with less resolution deterioration. Furthermore, the core displacement is not likely to occur and deterioration in resolution is small in spite of the deformation of the lens-barrel after repeating heat cycle test, thus eliminating the need for adhesive between the lenses or between the lens and lens-barrel.

The present invention provides a lens device where a plastic lens having a circular outer peripheral surface is placed in a plastic lens-barrel having an inner surface of an octagonal or more complex polygonal shape in such a way that the outer peripheral surface of the lens is pressed against the inner surface of the polygonal shape. This lens device has press contact portions that are pressed by the lens outer peripheral surface and the lens-barrel inner surface in the vicinity and in both sides of a gate trace where a displacement is large so as to suppress the displacement of the gate trace by the press contact portions. It is thereby possible to suppress the optical axis misalignment between the lens and the lens-barrel or between the lenses, thus achieving a lens device with suitable optical properties.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Figure 1:
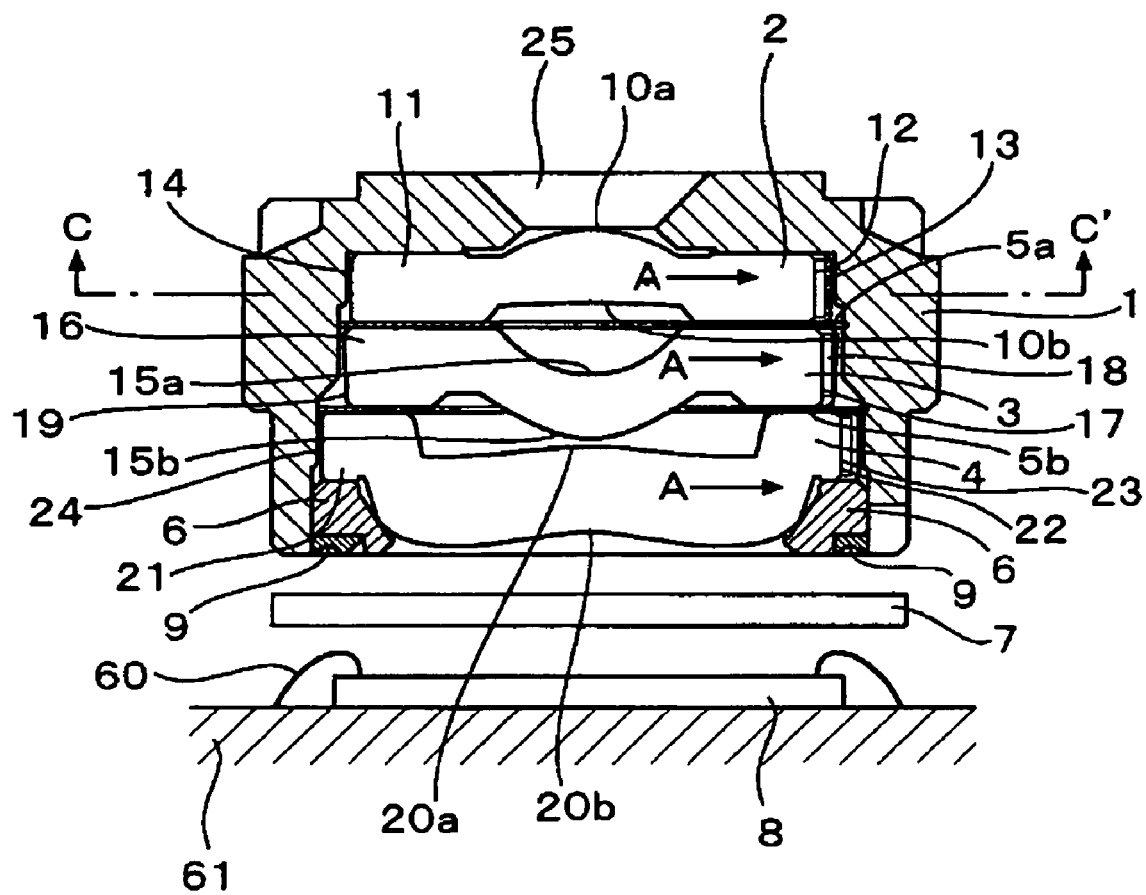
FIG. 1 is a cross-sectional view of a lens device according to an embodiment of the present invention.
Figure 2:
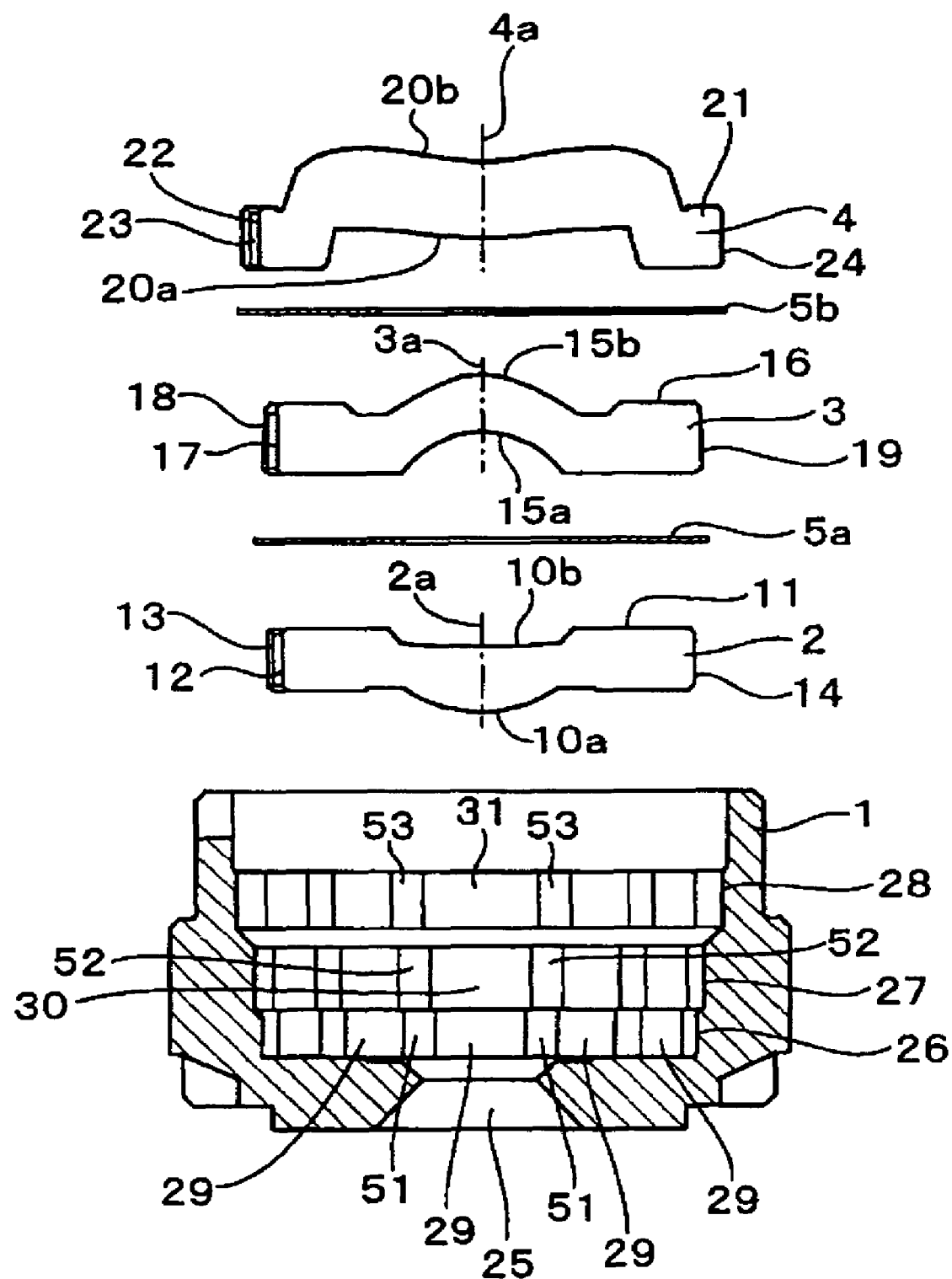
FIG. 2 is an exploded cross-sectional view of a main part of the lens device.

An embodiment of the lens device according to the present invention is described hereinafter with reference to the drawings. FIG. 1 is a cross-sectional view of a lens device according to a first embodiment of the invention. FIG. 2 is an exploded cross-sectional view of the main part of the lens device.

As shown in FIGS. 1 and 2, the lens device of this embodiment is basically composed of a lens-barrel 1, a first positive lens 2, a second positive lens 3, a correction lens 4, a diaphragm 5 and a lens holder 6. The black lens-barrel 1 is made of composite of polycarbonate resin, glass fiber, and black pigment such as carbon black and has an outer diameter of 8 mm. The first positive lens 2 is made of amorphous polyolefin resin and has an outer diameter of 5.7 mm and refractive power of 204 in diopter. The first positive lens 2 is pressed into the lens-barrel 1 with a certain space and held therein. The second positive lens 3 has an outer diameter of 5.9 mm and refractive power of 38 in diopter. The correction lens has an outer diameter of 6.4 mm and refractive power of −15 in diopter. The diaphragm 5 is made of synthetic resin film such as PET that is mixed with carbon black. The diaphragm 5 is placed between the positive lens 2 and the positive lens 3 and between the positive lens 3 and the correction lens 4. The lens holder 6 is made of composite of polycarbonate resin, glass fiber, and black pigment such as carbon black.

FIGS. 1 and 2 also show an infrared ray cut filter 7 for blocking a light ray with a long wavelength, a solid-state image sensing device 8 such as CCD for converting an image formed by the lens device into an electric signal, an adhesive 9 for fixing the lens holder 6 to the lens-barrel 1, a wiring 60 and a printed wiring board 61. The focal length f of the entire system of the lens device is 4.8 mm, and the diagonal length of the solid-state image sensing device is 6.2 mm.

Figure 3:
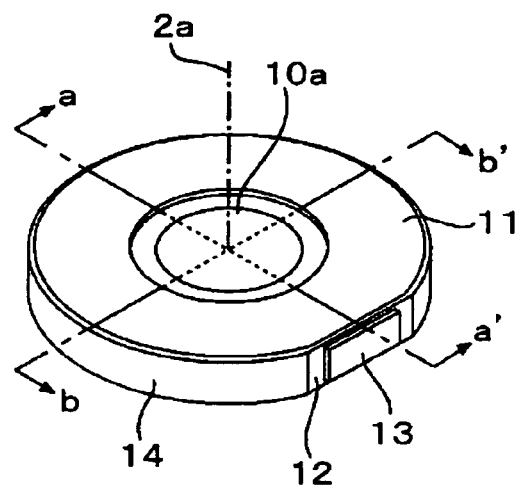
FIG. 3 is a perspective view of a first lens used in the lens device.
Figure 4:
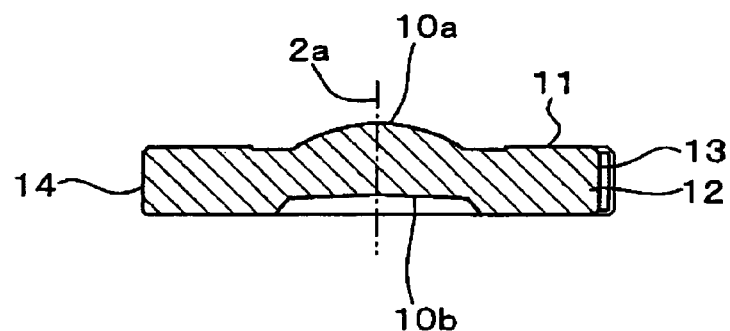
FIG. 4 is a cross-sectional view along line a-a' in FIG. 3.
Figure 5:
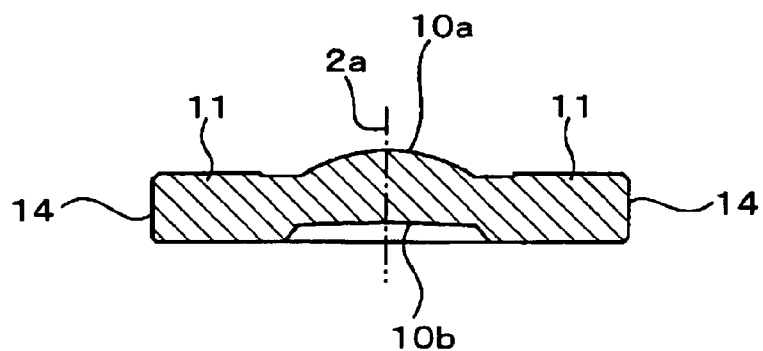
FIG. 5 is a cross-sectional view along line b-b' in FIG. 3.
Figure 6:
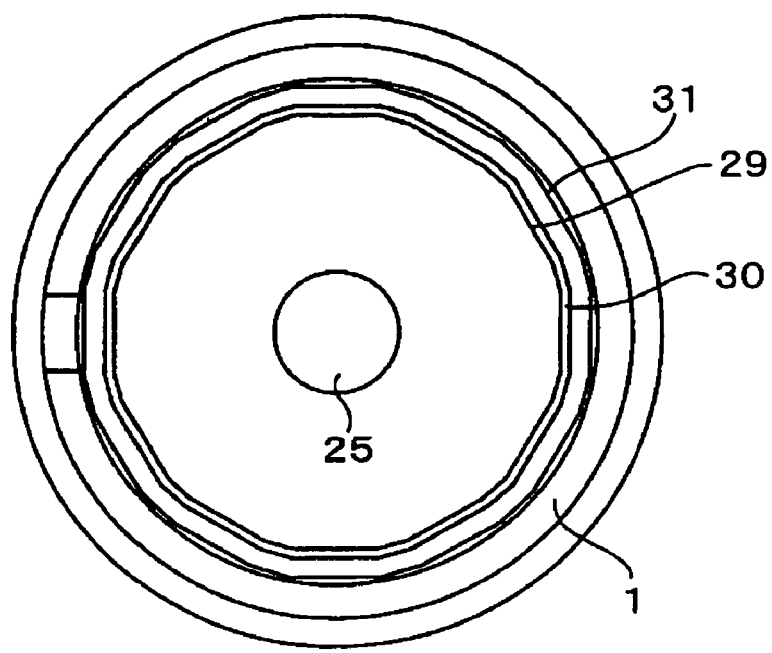
FIG. 6 is a top view of a lens-barrel shown in FIG. 2.

As shown in the perspective view of FIG. 3, the cross-sectional view of FIG. 4 along line a-a' in FIG. 3 and the cross-sectional view of FIG. 5 along line b-b' in FIG. 3, the first positive lens 2 has a first optical functional surface 10a on its one surface in the central part and a second optical functional surface 10b on the other side. The first optical functional surface 10a is a convex aspheric surface when viewed from the objective side. The second optical functional surface 10b is a concave aspheric surface when viewed from the image side. The first positive lens 2 further has a circular flange 11 in the outer periphery of the optical functional surfaces 10a and 10b.

Since the lens 2 is formed of amorphous polyolefin resin by injection molding, a gate trace 13 that has a flat surface 12 is made in a part of the outer peripheral surface of the lens 2. The other part is an outer peripheral surface 14 of an arc shape that centers on the center of the lens.

The positive lens 3 that is the second lens and the correction lens 4 also have the same shape. The second lens 3 has optical functional surfaces 15a and 15b, a circular flange 16, a flat surface 17, a gate trace 18 and an arc outer peripheral surface 19. The correction lens 4 has optical functional surfaces 20a and 20b, a circular flange 21, a flat surface 22, a gate trace 23 and an arc outer peripheral surface 24.

The outer diameters of the first lens 2, the second lens 3 and the correction lens 4 become larger sequentially from the object side, and optical axes 2a, 3a and 4a of these lenses are located in substantially the central part.

On the other hand, the lens-barrel 1 is formed of the composite by injection molding. As shown in FIG. 2, the lens-barrel 1 has a through hole 25 that functions as an optical diaphragm in the center of the bottom. The lens-barrel 1 further has a first step portion 26 for housing the first lens 2, a second step portion 27 for housing the second lens 3 and a light shielding diaphragm 5a, and a third step portion 38 for housing the correction lens 4 and a light shielding diaphragm 5b. The cross-sections of the inner surfaces of the step portions 26, 27 and 28 have the inner side surfaces 29, 30 and 31 of regular dodecagonal shape.

The inner diameter of the inscribed circle of the dodecagonal shape is slightly smaller than the outer diameter of the first lens 2, the second lens 3 and the correction lens 4, and it is 0.01 to 0.03 mm in diameter. If the first lens 2, the second lens 3 and the correction lens 4 are inserted to the step portions 26, 27 and 28, it is in the press-fit state. Thus, the inner side surfaces 29, 30 and 31 and the lens peripheral surfaces 14, 19 and 24 are in pressure contact with each other at the press contact portions, which is described later. The lenses 2, 3 and 4 are thereby housed and held in the lens-barrel 1 in the state where the optical axis 1a of the lens-barrel and the optical axes of the lenses 2, 3 and 4 are aligned. Further, arc-shaped connections 51, 52 and 53 are formed in correspondence to peripheral surface portions 44a, 44b, 45a, 45b, 46a and 46b of the movable core pin 39, which is described later.

When housing the first lens 2, the second lens 3 and the correction lens 4 in the lens-barrel 1 having such an inner surface, the arc-shaped outer peripheral surfaces 14, 19 and 24 of the lenses 2, 3 and 4 are inserted so as to be in contact with the inner side surfaces 29, 30 and 31 of the regular dodecagonal shape of the lens-barrel 1, which allows appropriate press fitting and holding.

Figure 7:
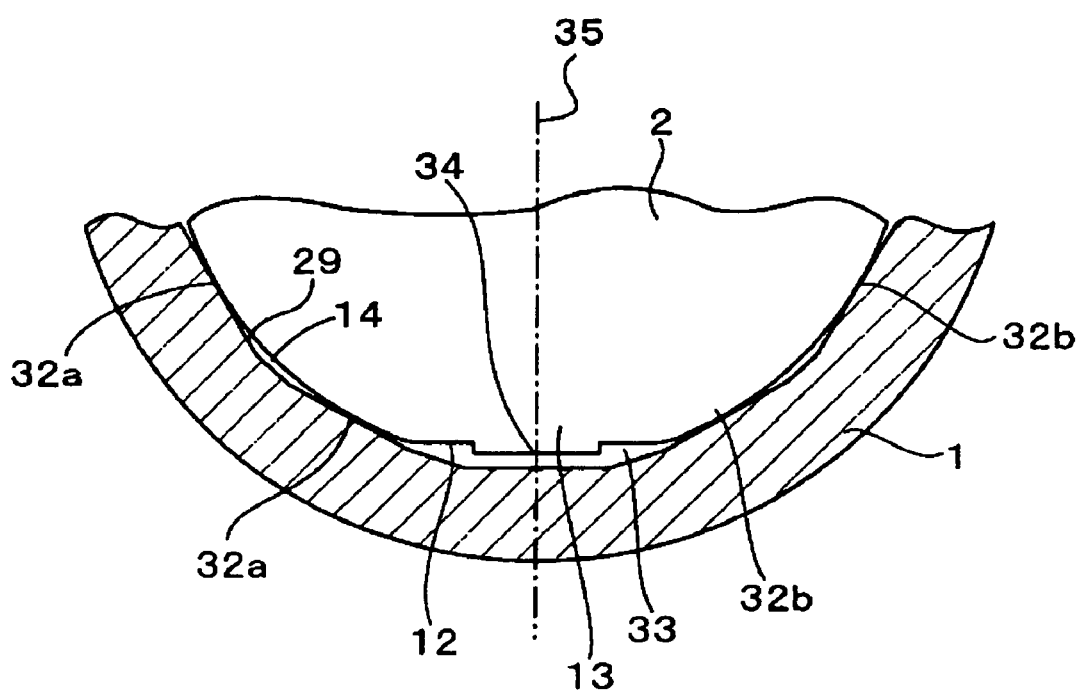
FIG. 7 is an enlarged cross-sectional view showing a part of the section along line c-c' in FIG. 1.

In the gate traces 13, 18 and 23 of the lenses 2, 3 and 4, the gate trace 13 is located closer to the center than the arc-shaped outer periphery of the lens 2 as illustrated in FIG. 7 that takes the first lens 2 as an example. Thus, the gate trace 13 is not press fit to the inner side surface 29, and a gap 33 is large compared with the press contact portions 32a and 32b between the arc-shaped outer peripheral surface 14 of the lens 2 and the inner side surface 29. This causes a decrease in the circularity due to expansion and shrinkage upon temperature or humidity change to make the optical axis deviated toward the gate trace 13. To overcome this drawback, this embodiment forms the press contact portions 32a and 32b to be in press contact with the lens peripheral surface 14 in the vicinity of and in both sides of the gate trace 13 with respect to the reference line 35 that connects the center 34 of the gate trace and the optical axis 2a, thereby suppressing the deviation of the optical axis.

Figure 8:
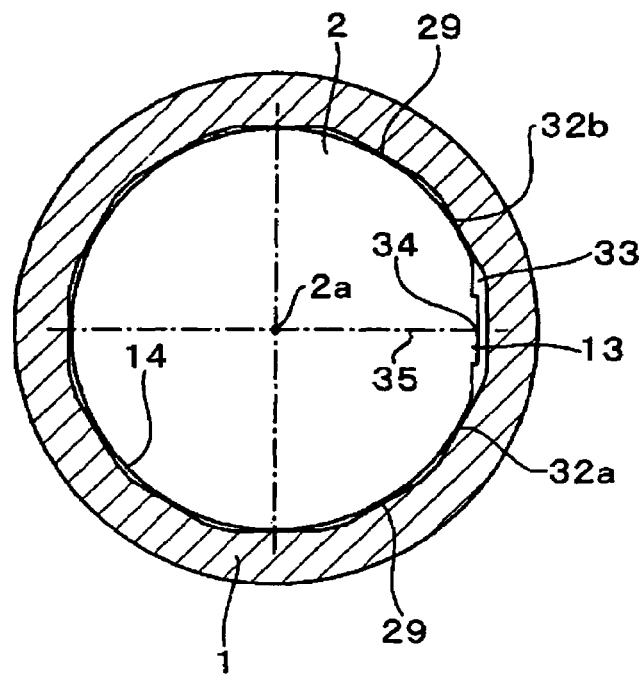
FIG. 8 is a cross-sectional view showing a part of the section along line c-c' in FIG. 1 when a gate trace of the first lens is placed in parallel with the inner side surface of the lens-barrel.
Figure 9:
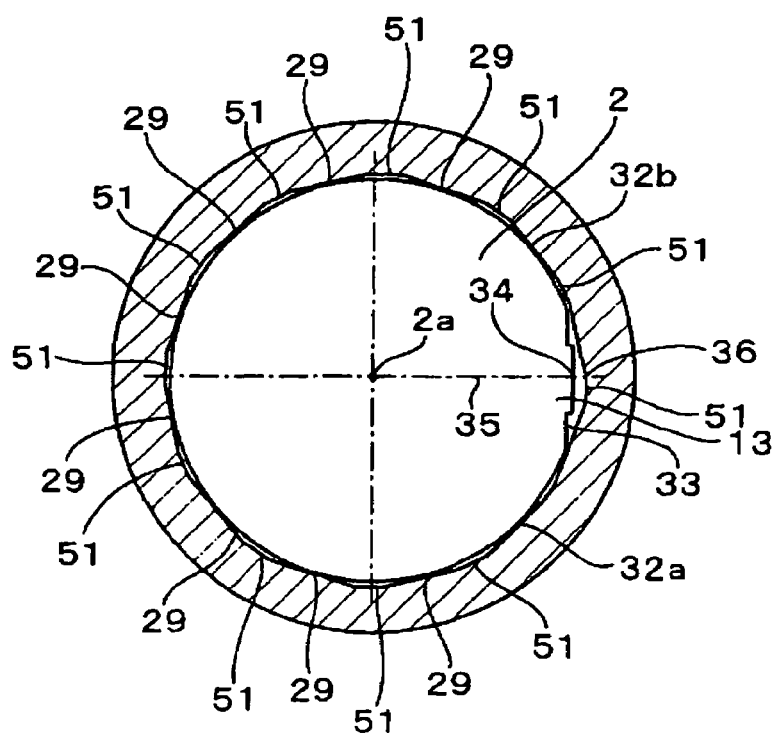
FIG. 9 is a cross-sectional view showing a part of the section along line c-c' in FIG. 1 when a gate trace of the first lens is placed to face the connection in the inner surface of the lens-barrel.

FIGS. 8 and 9 show the press-contacted state between the inner side surface 29 in the first step portion 26 of the lens-barrel 1 and the outer peripheral surface 14 of the first lens 2 as an example. FIG. 8 shows the case where the lens is inserted so that the inner side surface 29 is in parallel with the gate trace 13. In FIG. 9, the arrangement of the gate trace 13 of the lens 2 and the inner side surface 29 of the lens-barrel 1 is different from FIG. 8. Specifically, FIG. 9 shows the case where the lens is inserted so that the connection 36 at the joint part of the adjacent inner side surfaces 29 faces the gate trace 13. The configuration of FIG. 8 is preferred since the supporting point is in close proximity to the gate trace and the deviation of the optical axis is thus small.

Figure 10:
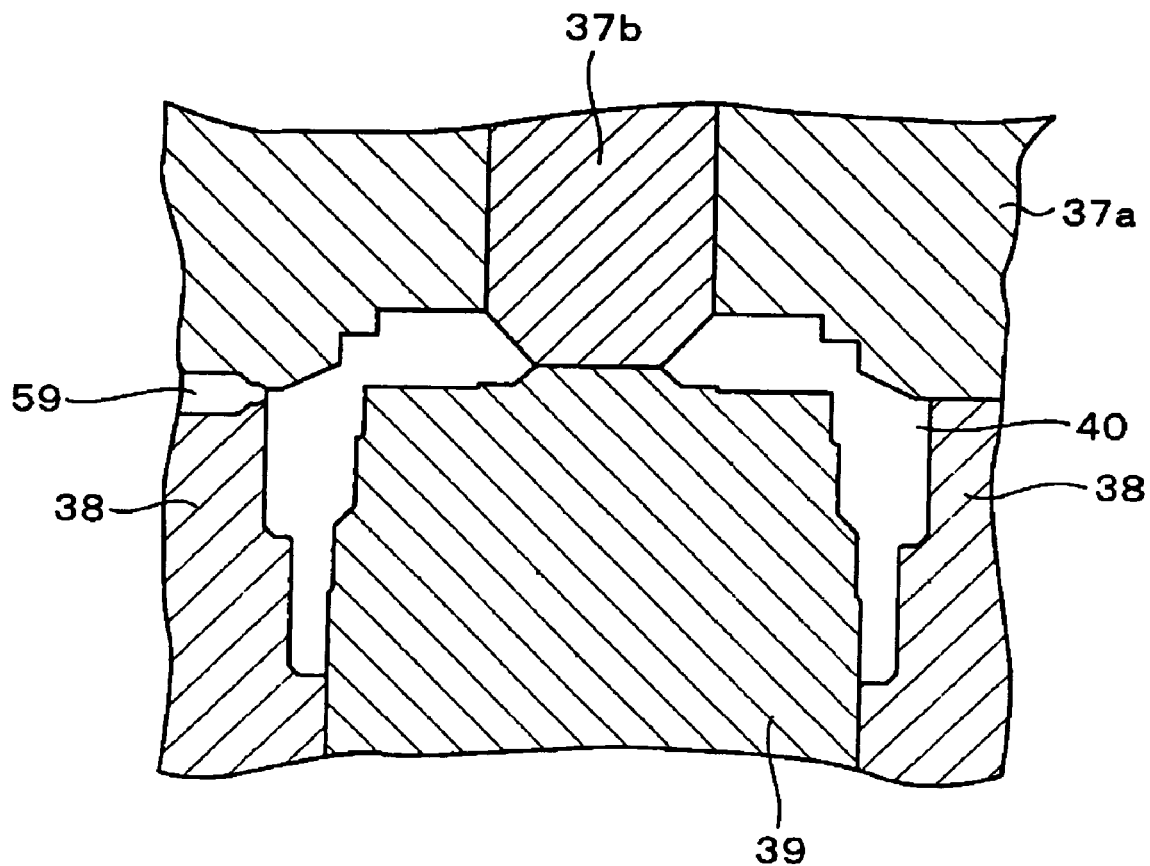
FIG. 10 is a cross-sectional view of a mold for manufacturing a lens-barrel used in a lens device according to an embodiment of the present invention.

A method of manufacturing the lens-barrel 1 having the inner side surfaces 29, 30 and 31 of regular dodecagonal shapes is described below. As shown in FIG. 10, the method uses a mold that combines a fixed core 37a, a fixed core pin 37b, a movable core 38 and a movable core pin 39, and injection-molds molten resin made of the composite into a cavity 40 that is created when the mold is assembled. A gate portion 59 in FIG. 10 is used for injecting the molten resin into the cavity 40.

In this case, as shown in FIG. 11, the movable core pin 39 has a first protrusion 41, a second protrusion 42 and a third protrusion 43 that correspond to the first step portion 25, the second step portion 26 and the third step portion 27, respectively, of the lens-barrel 1. The peripheral surfaces of the protrusions 41, 42 and 43 respectively have twelve peripheral surface portions 44, 45 and 46.

Figure 12:
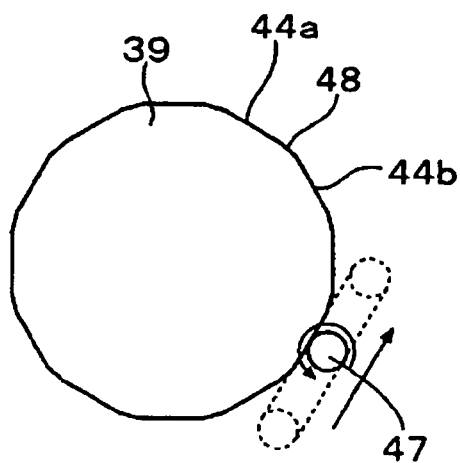
FIG. 12 is a schematic top view to describe a method of manufacturing a core of a molding die for manufacturing a lens-barrel used in a lens device according to an embodiment of the present invention.

The movable core pin 39 of a regular dodecagonal shape having the peripheral surface portions 44, 45 and 46 can be easily manufactured by using an end mill 47 of a machining center (not shown) as shown in FIG. 12 that illustrates the first protrusion as an example. Specifically, a part of the arc-shaped surface of the first protrusion 41, the second protrusion 42 and the third protrusion 43 is cut by a predetermined amount from the cylindrical body having the protrusion 41, 42 and 43, thereby forming the movable core pin 39 having the regular dodecagonal peripheral surface portions 44, 45 and 46 on the peripheral surfaces of the protrusions 41, 42 and 43, respectively.

Figure 11A:
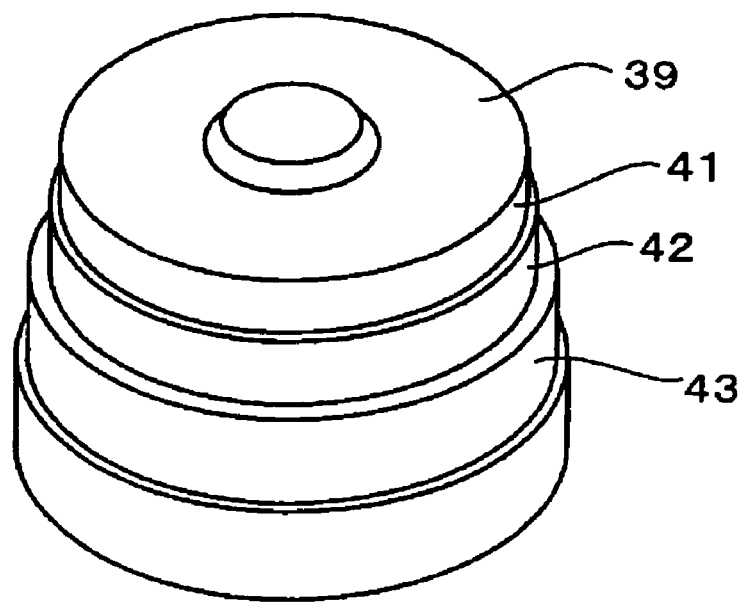
FIGS. 11A and 11B are perspective views showing a core of a molding die in the course of processing and after the processing, respectively, for manufacturing a lens-barrel used in a lens device according to an embodiment of the present invention.
Figure 11B:
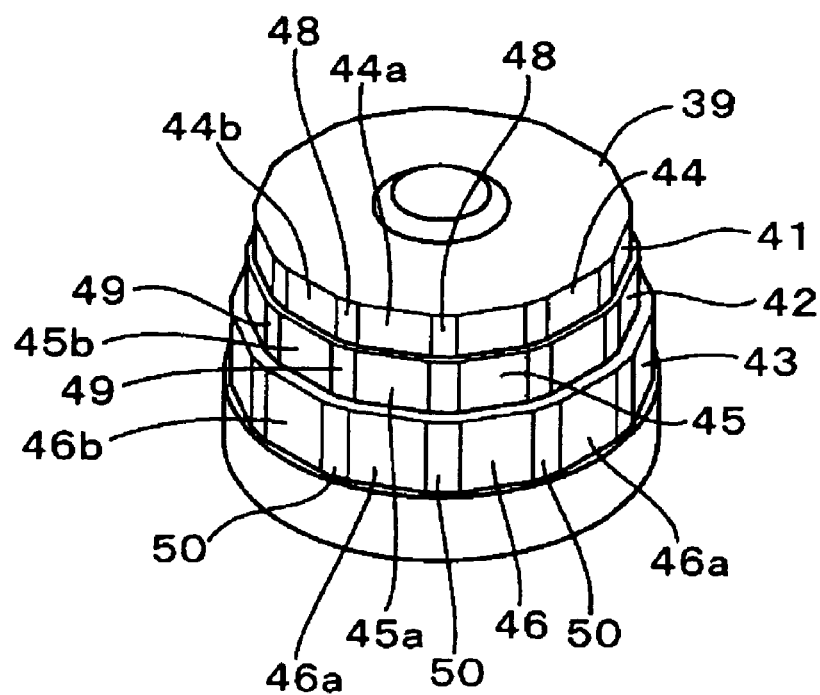

When manufacturing the movable core pin 39, multi-step coaxial processing is performed firstly by using NC lathe (not shown) so that the base material of the cylindrical body has a desired outer diameter as shown in FIG. 11A. Then, the coaxial multi-step pin that has been produced by using the machining center (not shown) is rotated about the center of the multi-step pin every 30 degrees in accordance with the number of corners of the polygonal shape, which is 12 in this case, and then a part of the arc-shaped surface is linearly processed by the end mill 47. The cutting is repeated 11 times as leaving a finish processing margin, thereby creating a regular dodecagonal shape. Repeating this process to create three steps completes a product before correction of the movable core pin 39 as shown in FIG. 11B.

The obtained movable core pin is assembled into the mold and then injection molding is performed with desired resin and molding conditions, thereby producing a molded article. The molded article is then attached to a circularity measuring unit to obtain the circularity and coaxiality of the injection-molded article, and a correction amount is added to the finish margin so that the circularity and coaxiality become 0. After that, the cutting amount of the end mill 47 is determined by using the machining center again, thus producing the movable core pin 39 in final form.

In the peripheral surface portions 44, 45 and 46 formed on the periphery of the protrusions 41, 42 and 43 of the movable core pin 39, arc-shaped corrections 48, 49 and 50 where a part of the cylindrical body remains may be created between adjacent peripheral surface portions 44a, 44b, 45a, 45b, 46a and 46b. Use of this movable core pin 39 allows easy release of the molded article (lens-barrel) from the mold in the injection molding of the lens-barrel 1.

If the lens-barrel 1 is injection molded by using the above movable core pin 39, the inner surface of each step portion is formed to have the flat inner side surface 29 and the arc-shaped connection 51 between the inner side surfaces as shown in FIG. 9.

Figure 13:
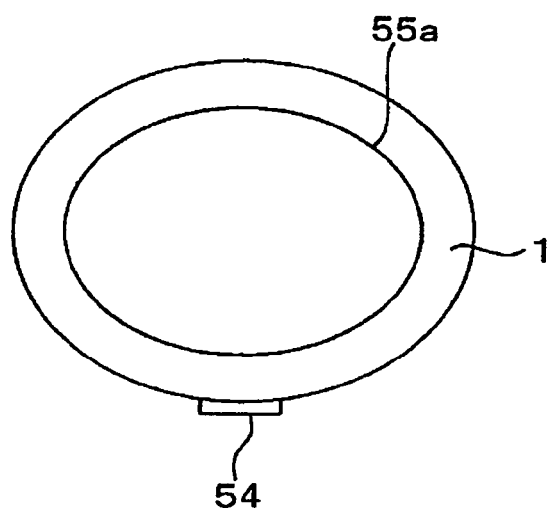
FIG. 13 is a schematic top view to describe a distorted state of a lens-barrel due to injection molding in a lens device according to an embodiment of the present invention.
Figure 14:
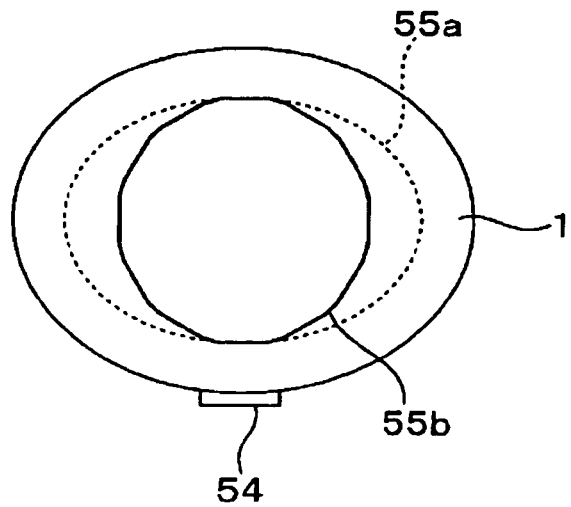
FIG. 14 is a schematic top view to describe the correction of the distortion of a lens-barrel due to injection molding in a lens device according to an embodiment of the present invention.

The lens-barrel 1 has the characteristics that when molded in the above manner, the inner peripheral surface 55*a* is not likely to be formed in a regular circular shape but likely to be deformed in an oval shape centering on the gate trace 54 as shown in FIG. 13. In the even of the deformation, it is possible to cut the outer peripheral surface of the protrusions 41, 42 and 43 of the core 39 appropriately by the machining center 47 so as to create the polygonal inner peripheral surface 55*b* having a circle circumscribing of a regular circular shape as shown in FIG. 14.

Figure 15:
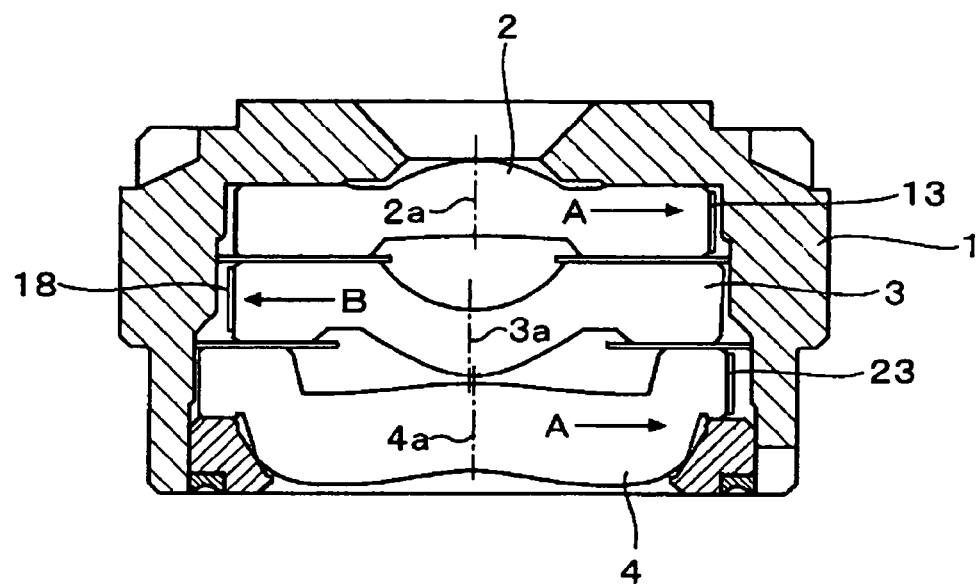
FIG. 15 is a cross-sectional view showing a lens device according to a first embodiment of the present invention.

The first lens 2, the second lens 3 and the correction lens 4 that are manufactured in the above manner are then pressed into the first step portion 26, the second step portion 27 and the third step portion 28, respectively, of the lens-barrel 1 and held therein. At this time, if the lenses 2, 3 and 4 are placed so that their gate traces 13, 18 and 23 are arranged in the 180 degree different directions as shown in FIG. 15, the deviation of the optical axis is likely to occur between the lenses in the directions of the arrows A and B when temperature changes. On the other hand, if the lenses 2, 3 and 4 are placed so that their gate traces 13, 18 and 23 are arranged in the same direction (the direction of the arrow A) as shown in FIG. 1, the deviation of the optical axis between the lenses is not likely to occur when temperature changes.

The following table shows the resolutions on five samples of lens devices where the lenses 2, 3 and 4 are arranged in the lens-barrel 1 having a regular dodecagonal inner surface so that the directions of the gate traces 13, 18 and 23 differ by 180 degrees (Example 1) and so that the directions are the same (Example 2). The resolutions are measured immediately after assembling the lenses into the lens-barrel 1 (initial stage) and after performing temperature cycle test that repeats 200 cycles of cooling and heating process under −40° C. for 30 minutes and under 85° C. for 30 minutes.

The evaluations are made under the following conditions.

A subject distance is 1 m, a light source is halogen white light, and a subject is a 30 mm square chart. A step response is calculated from an edge image of the chart, and the result is differentiated to obtain an impulse response. Further, the result is Fourier converted, thereby obtaining Modulation Transfer Function (MTF), which is frequency response component thereof. In the square chart, two orthogonal directions are sagittal and meridional components and the opposing two sides are respectively averaged. A defocus position is an intermediate position of the peak positions of the sagittal and meridional under the center 80/mm, and the resolution is a value under contrast of 20%.

As for the measurement positions, eight positions with the image height of 70% for the diagonal length 6.2 mm of the solid-stage imaging device are measured for every 45 degrees in the circumferential direction. Table shows that the lowest values in the sagittal and meridional values in the center and the sagittal and meridional values at the eight points under the image height of 70% are respectively put together. A larger value indicates a higher resolution.

TABLE 1

|  | Sample number | Example 1 | | Example 2 | |
|---|---|---|---|---|---|
|  |  | Center | Image height 70% | Center | Image height 70% |
| Initial stage | No 1 | 209.5 | 121.9 | 215 | 128 |
|  | No 2 | 209.9 | 120.4 | 218.4 | 133 |
|  | No 3 | 216.1 | 115 | 215.5 | 104.9 |

TABLE 1-continued

|  | Sample number | Example 1 | | Example 2 | |
|---|---|---|---|---|---|
|  |  | Center | Image height 70% | Center | Image height 70% |
|  | No 4 | 210.4 | 141.9 | 215 | 116.5 |
|  | No 5 | 208.8 | 114.2 | 215.2 | 112.3 |
| After temperature cycle test | No 1 | 206.7 | 110.5 | 212.3 | 123 |
|  | No 2 | 206.6 | 109.8 | 207.3 | 135.1 |
|  | No 3 | 209.9 | 112.4 | 206.9 | 105.3 |
|  | No 4 | 209.4 | 102.8 | 211.4 | 118.4 |
|  | No 5 | 206.3 | 110.1 | 214.2 | 110.1 |

The above results show that while the resolution under the image height of 70% slightly decreases after temperature cycle test in Example 1, it does not substantially decreases in Example 2, thus causing less optical axis deviation.

Table 2 below shows the measurement results of the resolutions in the initial stage and after the temperature cycle test where the lenses are arranged in the same manner as in Example 2, about the cases where the polygonal inner surface of the lens-barrel 1 is triangle (Comparative Example 1), hexagon (Comparative example 2), octagon (Example 3), and hexadecagon (Example 4).

TABLE 2

|  | Sample number | Comparative example 1 | | Comparative example 2 | |
|---|---|---|---|---|---|
|  |  | Center | Image height 70% | Center | Image height 70% |
| Initial stage | No 1 | 211.4 | 89.5 | 205.2 | 89.5 |
|  | No 2 | 212.5 | 103.6 | 210.4 | 103.6 |
|  | No 3 | 202.8 | 102.7 | 207.2 | 102.7 |
|  | No 4 | 206.2 | 92.3 | 211.9 | 92.3 |
|  | No 5 | 210.1 | 95.3 | 212.7 | 95.3 |
| After temperature cycle test | No 1 | 210.3 | 68.5 | 205.3 | 85.6 |
|  | No 2 | 206.1 | 58.8 | 206.1 | 66.3 |
|  | No 3 | 205.2 | 73.9 | 205.2 | 73.9 |
|  | No 4 | 207.8 | 68.4 | 212.6 | 68.9 |
|  | No 5 | 208.7 | 67.1 | 208.7 | 74.5 |

|  | Sample number | Example 3 | | Example 4 | |
|---|---|---|---|---|---|
|  |  | Center | Image height 70% | Center | Image height 70% |
| Initial stage | No 1 | 215 | 125.4 | 210 | 130.4 |
|  | No 2 | 218.4 | 131.2 | 215.6 | 115 |
|  | No 3 | 215.5 | 105.1 | 212 | 130.3 |
|  | No 4 | 215 | 116.2 | 216.6 | 120.9 |
|  | No 5 | 215.2 | 102.4 | 213.5 | 128.5 |
| After temperature cycle test | No 1 | 202.5 | 115.3 | 208.4 | 125.3 |
|  | No 2 | 209.4 | 105.6 | 209.4 | 136.7 |
|  | No 3 | 206 | 105.3 | 206 | 117.1 |
|  | No 4 | 210.5 | 108.4 | 210.5 | 120.9 |
|  | No 5 | 210.4 | 110.1 | 210.4 | 130.2 |

The above results show that Comparative example 1 with a triangular inner surface and Comparative example 2 with a hexagonal inner surface result in low resolution both in the initial state and after temperature cycle test, thus not for practical use. From the results of Examples 3 and 4, the resolution is higher when the inner surface is octagonal or hexadecagonal compared with when it is hexagonal shown in Comparative Example 2. It is thus obvious that a polygonal inner surface with a larger number of corners is more effective.

Figure 16:
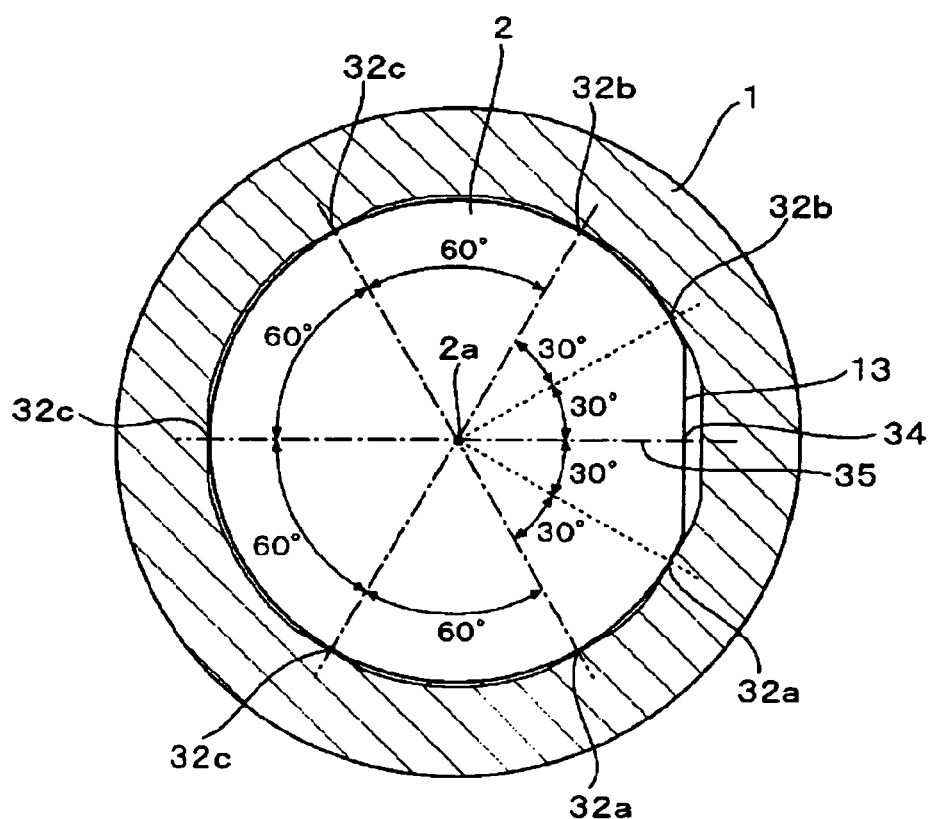
FIG. 16 is a cross-sectional view showing a lens device according to a fifth embodiment of the present invention, which is cut in a first lens portion.

Example 5 is the case where the peripheral surface of the lens (the first lens is illustrated as an example) is pressed against the lens-barrel 1 having a non-equiangular octagonal inner surface. As shown in FIG. 16, in Example 5, the angle between the reference line 35 and each of the press contact points 32a and 32b, the angle between the press contact points 32a and the angle between the press contact points 32b are each 30 degrees. The reference line 35 connects the center of the gate trace 13 and the optical axis 2a The angles between the other press contact points 32a and 32c, between 32c and 32c, and between 32c and 32b are each 60 degrees. Thus, in the area that is close to the gate trace 13, the press contact points 32a and 32b are placed with a narrower pitch.

Therefore, it has been found that the optical axis misalignment between the lens and the lens-barrel and between the lenses hardly occurs in spite of temperature or humidity change if the press contact points 32a and 32b are formed within 45 degrees from the gate trace 13 and if at least two points are formed in both sides of and within 90 degrees of the reference line 35 that connects the center of the gate trace 13 and the optical axis 2a. The second lens 3 and the correction lens 4 have the same configuration as the first lens.

Table below shows the results. It is obvious that the resolution under the image height of 70% is particularly improved compared with the case where the inner surface is a regular octagon as in Example 3.

TABLE 3

|  |  | Example 5 | |
| --- | --- | --- | --- |
|  | Sample number | Center | Image height 70% |
| Initial stage | No 1 | 214.5 | 125.5 |
|  | No 2 | 217.4 | 128.4 |
|  | No 3 | 214.7 | 105.6 |
|  | No 4 | 213.5 | 117.2 |
|  | No 5 | 215.5 | 114.6 |
| After temperature cycle test | No 1 | 212.6 | 122.5 |
|  | No 2 | 206.2 | 126.3 |
|  | No 3 | 206.6 | 114.6 |
|  | No 4 | 212.7 | 115.2 |
|  | No 5 | 212.6 | 112.7 |

The lens device according to the present invention may be effectively used for small-size and light-weight cameras such as a small video camera using a photo detector such as CCD and CMOS, an in-vehicle camera, a monitoring camera, a digital camera and a mobile phone camera. It is more effective for the case of using a plurality of lenses than the case of using a single lens.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A lens device comprising:
a plastic lens having a circular outer periphery; and
a plastic lens-barrel for holding the lens, having an octagonal or more complex polygonal inner surface,
wherein the lens is held by the lens-barrel in press contact with the inner surface of the lens-barrel.

2. The lens device according to claim 1, wherein
the lens includes a gate trace formed by injection molding, and the lens and the lens-barrel are in press contact with each other in a pressure contact portion located within ±45 degrees from a line connecting an optical axis of the lens and a center of the gate trace.

3. The lens device according to claim 2, wherein a plurality of pressure contact portions are formed within a half circle in the gate trace side with respect to the optical axis of the lens.

4. The lens device according to claim 2, wherein a plurality of pressure contact portions are formed symmetrically with respect to the line connecting the optical axis of the lens and the center of the gate trace.

5. The lens device according to claim 1, wherein an inner surface of the lens-barrel is a polygon of octagon to hexadecagon.

6. The lens device according to claim 1, wherein an inner surface of the lens-barrel is a regular polygon.

7. The lens device according to claim 1, wherein an inner surface of the lens-barrel is formed of flat surfaces constituting side surfaces and an arc-shaped connection connecting the flat surfaces.

8. The lens device according to claim 1, wherein a plurality of lenses are coaxially held by the lens-barrel.

9. The lens device according to claim 8, wherein the plurality of lenses are held by the lens-barrel so that gate traces made by injection molding are in the same direction.

10. The lens device according to claim 8, wherein the plurality of lenses are held by the lens-barrel so that gate traces of at least a lens with a largest absolute value of refractive power and a lens with a next-largest absolute value of refractive power are in the same direction.

11. A lens device comprising:
a plurality of plastic lenses, each having a circular outer periphery; and
a plastic lens-barrel for holding the lenses,
wherein the plurality of lenses are coaxially held by the lens-barrel in press contact with an inner surface of the lens-barrel in a pressure contact portion so that gate traces made by injection molding are in the same direction.

12. The lens device according to claim 11, wherein the lenses and the lens-barrel are in press contact with each other in a pressure contact portion located within ±45 degrees from a line connecting optical axes of the lenses and centers of the gate traces.

13. The lens device according to claim 11, wherein a plurality of pressure contact portions are formed within a half circle in the gate trace side with respect to optical axes of the lenses.

14. The lens device according to claim 11, wherein a plurality of pressure contact portions are formed symmetrically with respect to the line connecting optical axis of the lenses and centers of the gate traces.

15. The lens device according to claim 11, wherein an inner surface of the lens-barrel is an octagon or more complex polygon.

16. The lens device according to claim 11, wherein an inner surface of the lens-barrel is a regular polygon.

17. The lens device according to claim 11, wherein an inner surface of the lens-barrel is formed of flat surfaces constituting side surfaces and an arc-shaped connection connecting the flat surfaces.

* * * * *